(12) United States Patent
Kowalewki

(10) Patent No.: US 7,155,165 B1
(45) Date of Patent: Dec. 26, 2006

(54) METHOD AND RADIO STATION FOR THE TRANSMISSION OF PREDISTORED SIGNALS VIA SEVERAL RADIO CHANNELS

(75) Inventor: Frank Kowalewki, Salzgitter (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/830,540

(22) PCT Filed: Oct. 16, 1999

(86) PCT No.: PCT/DE99/03329

§ 371 (c)(1),
(2), (4) Date: Apr. 26, 2001

(87) PCT Pub. No.: WO00/27046

PCT Pub. Date: May 11, 2000

(30) Foreign Application Priority Data

Oct. 30, 1998 (DE) ................................. 198 50 279

(51) Int. Cl.
H04B 1/00 (2006.01)
(52) U.S. Cl. ...................... 455/65; 455/63.1; 455/63.4; 455/562.1; 375/231; 375/232; 375/267; 375/299; 375/346; 375/347; 375/348
(58) Field of Classification Search ................ 455/504, 455/506, 562, 65, 63.1, 575.1, 63.4, 561, 455/562.1, 67.13; 375/229–233, 144, 148, 375/260, 267, 299, 346–348, 296; 342/368
See application file for complete search history.

(56) References Cited

U.S. PATENT DOCUMENTS

| | | | |
|---|---|---|---|
| 4,967,164 A | | 10/1990 | Sari |
| 5,265,122 A | * | 11/1993 | Rasky et al. ................ 375/346 |
| 5,881,108 A | * | 3/1999 | Herzberg et al. ........... 375/296 |
| 6,167,039 A | * | 12/2000 | Karlsson et al. ............ 370/342 |
| 6,205,127 B1 | * | 3/2001 | Ramesh ...................... 370/329 |
| 6,373,832 B1 | * | 4/2002 | Huang et al. ............... 370/342 |
| 6,519,456 B1 | * | 2/2003 | Antonio et al. ............ 455/442 |
| 6,826,236 B1 | * | 11/2004 | Lo .............................. 375/299 |

FOREIGN PATENT DOCUMENTS

| | | |
|---|---|---|
| DE | 198 18 215 A1 | 11/1999 |
| EP | 0 776 101 A | 5/1997 |
| EP | 0 866 567 A | 9/1998 |
| FR | 2 735 937 A | 12/1996 |
| GB | 2 313 261 A | 11/1997 |

OTHER PUBLICATIONS

Weihua Zhuang; Huang, W.V.; Vehicular Technology, IEEE Transactions on ,vol. 46 , Issue: 1 , Feb. 1997 pp. 129-142.*

(Continued)

*Primary Examiner*—Edward F. Urban
*Assistant Examiner*—Raymond S. Dean
(74) *Attorney, Agent, or Firm*—Michael J. Striker

(57) ABSTRACT

A method and radio stations for transmitting signals between a first radio station (1) and a second radio station (2) are proposed, in which the influence of amplitude fluctuations or fading can be reduced. In a modulator (4) of the first radio station (1) a pre-equalization of the signals to be transmitted is performed. The pre-equalized signals are transmitted from the first radio station (1) to the second radio station (2) via a plurality of radio channels (20, 25).

16 Claims, 4 Drawing Sheets

OTHER PUBLICATIONS

Weihua Zhuang; Huang, W.V.;Vehicular Technology, IEEE Transactions on ,vol. 46 , Issue: 1 , Feb. 1997 pp. 129-142.*

Rapajic P.B. et al: "Linear Adaptive Transmitter-Receiver Structures for Asynchronous CDMA Systems" European Transactions on Telecommunications and Related Technologies, IT AEI, Milano, BD. 6, NR. 1, Jan. 1, 1995, Seiten 21-27.

"Zero Forcing and Minimum Mean-Square-Error . . . " Bny A. Klein et al, IEEE Transactions of Vehicular Technology, vol. 45, No. 2, May 1996.

Klaus David et al: "Digital Mobilfunksysteme", BG. Teubner Stuttgart, 1996, p. 50.

* cited by examiner

METHOD AND RADIO STATION FOR THE TRANSMISSION OF PREDISTORED SIGNALS VIA SEVERAL RADIO CHANNELS

PRIOR ART

The invention is based on a method for transmitting signals between a first radio station and a second radio station, and on radio stations, as generically defined by the preambles to the independent claims.

From German Patent Application Serial No. 198 18 215, a method for transmitting signals between a base station and a plurality of mobile stations via radio channels is already known, in which the data from different mobile stations are expanded with different codes. A pre-equalization of the signals to be transmitted is performed in a modulator.

If pre-equalized data signals are transmitted to a receiver via a multi-way transmission channel, then transmission errors can occur as a result of strong fading incursions. Fading is understood to mean amplitude fluctuations that can occur in multi-way reception of a transmitted signal.

ADVANTAGES OF THE INVENTION

The method and the radio stations according to the invention as defined by the characteristics of the independent claims have the advantage over the prior art that the pre-equalized signals are transmitted from a transmitter of the first radio station to a receiver of the second radio station via a plurality of radio channels. In this way, it is assured that at the second radio station, the reception of pre-equalized signals will take place without any substantial amplitude incursion.

By the provisions recited in the dependent claims, advantageous refinements of and improvements to the method and the radio stations of the independent claims are possible.

It is especially advantageous that one pre-equalized signal at a time is transmitted by a plurality of antennas of the transmitter of the first radio station and via a respective radio channel to the receiver of the second radio station, wherein for each radio channel an estimate of an impulse response is ascertained in the first radio station, and a pre-equalization of the signal to be broadcast from the applicable antenna is performed as a function of the estimate of the impulse responses of the radio channels. In this way it is assured that the transmission of signals between the first radio station and the second radio station via a plurality of radio channels is taken into account in the pre-equalization. Thus even in transmission via a plurality of radio channels, equalization of the received signals in the second radio station can be dispensed with, thus saving effort and expense in the second radio station.

An accurate estimate of the impulse response of the associated radio channel is obtained if a reference signal is transmitted from an antenna of the second radio station to the first radio station via the radio channels, and the estimate of the impulse response of the respective radio channel is derived from a reception of the reference signal in the first radio station via the respective radio channel.

An equalization for multi-channel reception of signals from the first radio station in the second radio station is not even necessary, if, in a second embodiment, a pre-equalized signal broadcast by the transmitter of the first radio station is received by a plurality of antennas of the receiver of the second radio station each via a respective radio channel, and in the first radio station an estimate of a total impulse response of all the radio channels is ascertained, and a pre-equalization of the signal to be broadcast by the first radio station is performed as a function of the estimate of the total impulse response. Also in this way, for the pre-equalization of the signal to be broadcast from the first radio station, the multi-channel transmission between the first radio station and the second radio station is taken into account.

An accurate estimate of the total impulse response is possible by transmission of a respective reference signal from the antennas of the second radio station to the first radio station via the associated radio channel, and the estimate of the total impulse response is derived from a superimposed reception of the reference signals in the first radio station. Pre-equalized signals transmitted from the first radio station to the second radio station then need merely be linearly combined in the second radio station and can subsequently be delivered to a demodulation without equalization. This saves effort and expense in the radio station as well.

It is especially advantageous that each reference signal is multiplied by a coefficient as a function of the radio channel used for its transmission, and that in the linear combination of the received signals formed by the antennas of the receiver, each received signal is multiplied by the coefficient of the radio channel used for its transmission. By a suitable choice of the coefficient, an alignment characteristic of the antennas of the second radio station in the direction of the first radio station can be achieved, so that a transmission of signals between the first radio station and the second radio station also requires less transmission power.

A further advantage is that via further radio channels, signals are transmitted between the first radio station or the second radio station and further radio stations, wherein the data from different radio stations transmitted with the signals is expanded with different codes, and that the pre-equalization is performed in the modulator of the first radio station as a function of all the different codes and of the transmission properties of all the radio channels. In this way, the pre-equalization can be further improved, so that even so-called inter-symbol interference (ISI) between transmitted data symbols of one radio station and multiple access interference (MAI), that is, interference from other radio stations, can be taken into account in the pre-equalization, so that even that kind of interference requires no equalization in the second radio station.

DRAWING

Exemplary embodiments of the invention are shown in the drawing and described in further detail in the ensuing description.

DESCRIPTION OF THE EXEMPLARY EMBODIMENTS

Figure 1:
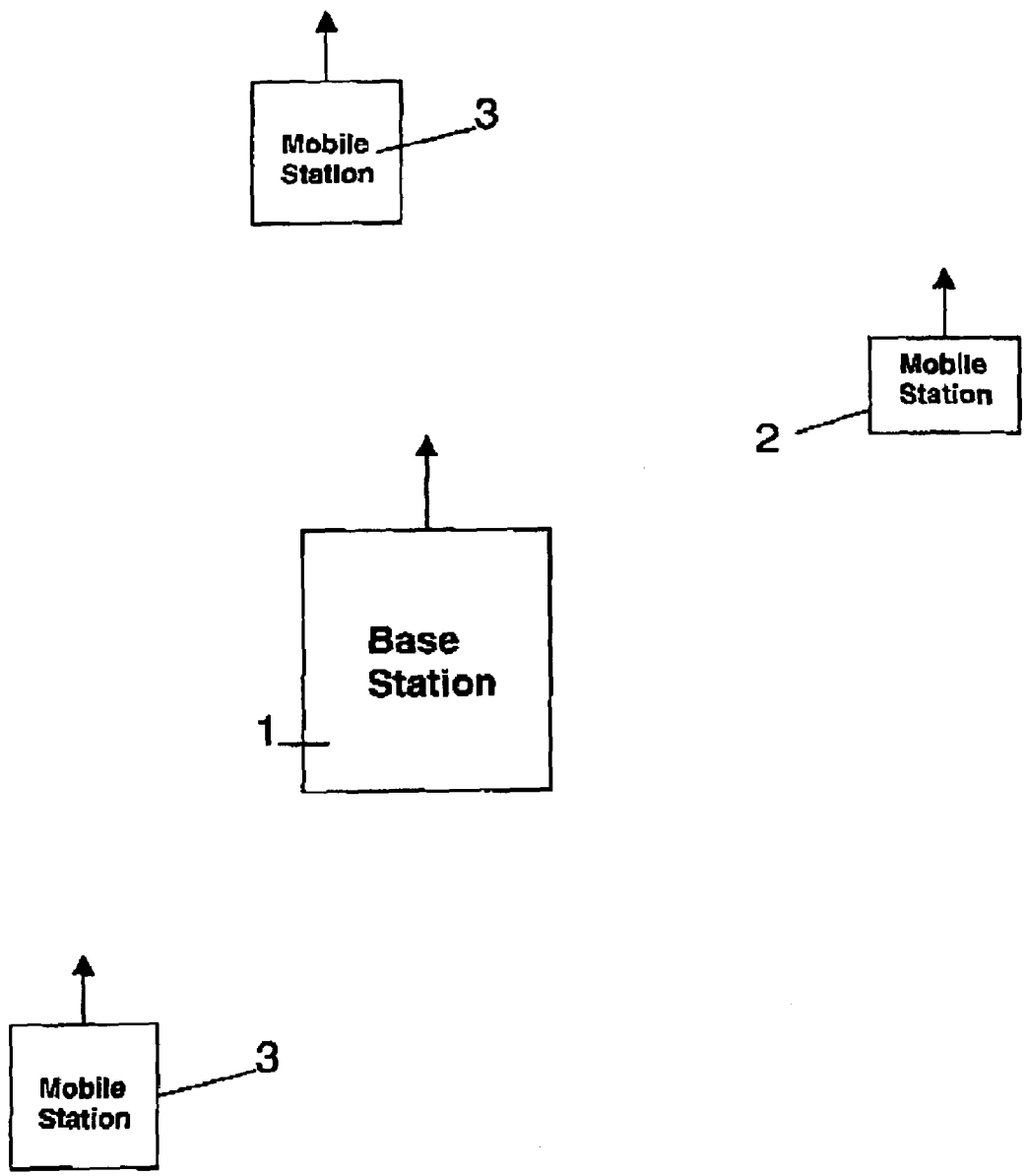
FIG. 1 shows the general layout of a mobile radio system or mobile telephone system.
Figure 2:
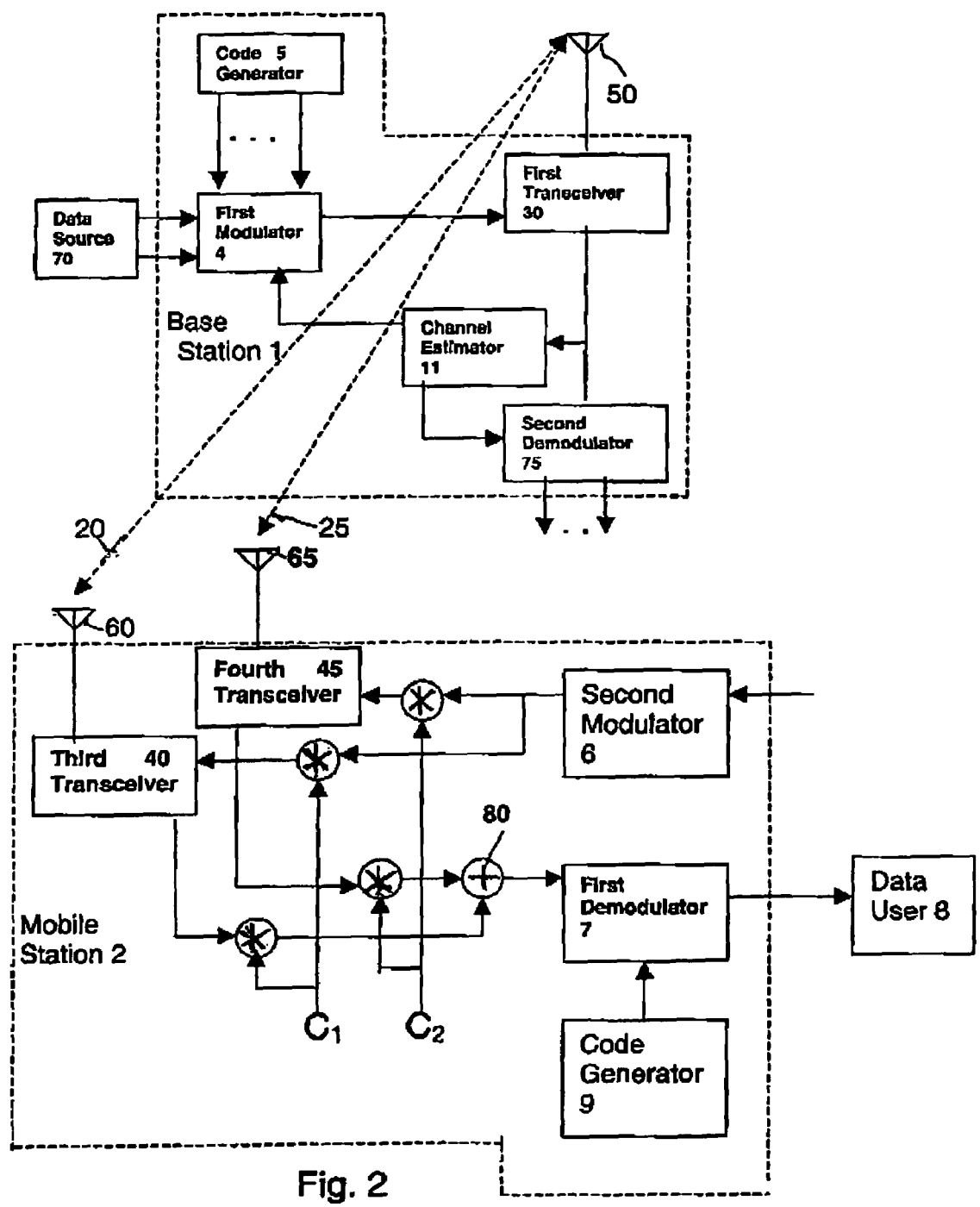
FIG. 2 is a block circuit diagram of a first embodiment for a first and second radio station.

FIG. 1 schematically shows a radio cell of a cellular mobile telephone system or mobile radio system, with a first radio station 1 embodied as a base station, a second radio station 2 embodied as a mobile station, and further radio stations 3, also embodied as mobile stations. What is essential in this system is that an exchange of data always takes place only between the base station 1 and the mobile stations 2, 3, and no direct data exchange between the mobile stations 2, 3 is possible. Accordingly, the base station 1 is also called a central station, while the base stations 2, 3 are called peripheral stations. The exchange of data between the base station 1 and the mobile stations 2, 3 takes place by radio transmission. The radio transmission from the base station 1 to one of the mobile stations 2, 3 is called a downlink, while the data transmission from one of the mobile stations 2, 3 to the base station 1 is called an uplink. In such a system, shown in FIG. 1, with a central or base station 1 and a plurality of peripheral or mobile stations 2, 3, it must be defined how the data for the various mobile stations 2, 3 will be modulated, so that they can be detected separately in the receivers of the various mobile stations 2, 3. The system of FIG. 1 involves what is known as a CDMA system (code division multiple access system), in which for the data transmission a common frequency band is available, and the individual radio channels between the base station 1 and the various mobile stations 2, 3 differ from one another in terms of a code with which the signal for the applicable mobile station 2, 3 is expanded. This kind of coding is not necessary, however, if besides the base station 1 there is only a single mobile station 2, 3 in the radio cell. Below, the case in which there are a plurality of mobile stations 2, 3 in the radio cell along with the base station 1 will be described. As a result of the expansion with the code, each signal that is to be exchanged between the base station 1 and a certain mobile station 2, 3 is distributed over the entire available spectrum. Each individual information bit to be transmitted is broken down into many small "chips". As a result, the energy of one bit is distributed over the entire frequency spectrum that is available to the CDMA system. In FIG. 2, a CDMA system is explained in greater detail in terms of a downlink transmission. FIG. 2 again shows the first radio station 1, embodied as a base station, and the second radio station 2, embodied as a mobile station. The base station 1 includes a first antenna 50. The second radio station 2 includes a third antenna 60 and a fourth antenna 65. The first radio station 1 and the second radio station 2 thus exchange data via a first radio channel 20 and a second radio channel 25. The first radio channel 20 describes a transmission path between the first antenna 50 and the third antenna 60.

The second radio channel 25 describes a transmission path between the first antenna 50 and the fourth antenna 65. The first radio station 1 includes a first modulator 4, which prepares the data streams from data sources 70 for transmission via the first radio channel 20 and the second radio channel 25. To that end, the first modulator 4 also requires code information, which is made available by a code generator 5. As an example, in FIG. 2 two arrows from the data sources 70 to the first modulator 4 and two arrows from the code generator 5 to the first modulator 4 are shown, which respect two different data streams, or two different items of code information. In an actual system, a substantially greater number of data streams and items of code information will be processed simultaneously. From the data streams and the code information, the first modulator 4 generates a transmission signal, which is transmitted to the second radio station 2 and the further radio stations 3. In FIG. 2, by way of example only the second radio station 2 is shown in the form of a receiving mobile station. If only the second radio station 2 were provided as a receiving mobile station in the radio cell to be supplied with a single data stream, then only one code information would be needed in the first radio station 1. However, as a rule, the first radio station 1 simultaneously transmits over corresponding radio channels to the further radio stations 3 as well, whose respective data are likewise modulated with various codes. For the sake of simplicity, these further radio stations 3 are not shown in FIG. 2.

The code generator 5 generates codes as a function of selected radio connections to the mobile stations 2, 3. The data to be transmitted with the signals are expanded with these codes in the first modulator 4.

In the transmission between the first radio station 1 and the second radio station 2, many instances of interference occur. One kind of interference is called ISI (for intersymbol interference) and occurs because a transmitted radio signal can reach the receiver over a plurality of different paths, and the arrival times at the receiver differ slightly. Hence this kind of interference in the affected radio channel is due to the fact that signals transmitted earlier interfere with signals being received at the moment (hence the term inter-symbol interference). Another kind of interference is due to the fact that a plurality of data streams are transmitted simultaneously but differ only in terms of the code. This interference occurs when the base station 1 is in simultaneous radio contact with a plurality of mobile stations 2, 3, which is the rule in modern mobile phone systems. Hence this kind of interference originates in the signals of different users and is therefore also known as MAI (for multiple access interference).

FIG. 2 also shows the receiving part of the second radio station 2, embodied as a mobile station, which is intended for receiving downlink data via the first radio channel 20 and the second radio channel 25. For this purpose a first demodulator 7 is provided, which processes the radio signals received via the third antenna 60 and the fourth antenna 65. The first demodulator 7 processes the received signals, so that from them it can generate a data stream for a data user 8. If the transmitted data are speech information, for instance, then the data user 8 is a speech decoder; with other kinds of data, it is for instance a computer or a fax machine. As a rule, mobile stations have only a single data user 8 and thus only a single data stream as well. If the transmission via the first radio channel 20 and the second radio channel 25 were completely without interference, then the first demodulator 7 for demodulation purposes would need merely to know the code information of the data to be detected for the user 8. However, because of the above-described kinds of interference, this is inadequate. A first channel estimator 11 is therefore provided in addition in the base station; it makes information about the transmission properties of all the radio channels between the base station 1 and the mobile stations 2, 3 available. The first modulator 4 then generates a transmission signal, which takes both the ISI and the MAI into account. The transmission signal in each case is designed such that each of the mobile stations 2, 3 upon reception receive an interference-free signal, as much as possible. Both the kinds of interferences that are due to the simultaneous use of multiple codes and the kinds of interference that arise from the transmission properties of the individual radio channels are taken into account. The receiver of the data, that is, the second radio station 2, is correspondingly of simple design as shown in FIG. 2. It has the first demodulator 7, which receives the signal of the third antenna 60 and the fourth antenna 65. The code information for the applicable data stream must also be made available to this first demodulator 7 by a further code generator 9, and from that the first demodulator 7 then generates the data stream for the data user 8. The second radio station 2 can thus be designed especially simply.

FIG. 2 has shown that in the downlink transmission, advantageously all the kinds of interference in the radio channels 20, 25 in the transmitting stations are taken into account in the downlink transmission, or in other words in the base station 1. The downlink part of the second radio station 2 and of the further radio stations 3 can therefore be especially simple in design. To keep these mobile stations 2, 3 simple for the uplink path as well, or in other words for sending data from the applicable mobile station 2, 3 to the base station 1, a method in accordance with the article by A. Klein, G. K. Kaleh and P. W. Beier, entitled "Zero forcing and minimum mean-square-error equalization for multi user detection in code-division-multiple-access channels", IEEE Trans. Vehic. Tech., vol. 45 (1996), pages 276–287, could be used; in this method, the ISI and the MAI are taken into account in the receiving station, or in other words again in the base station 1. To that end, the first channel estimator 11 would then be connected in addition to the second demodulator 75. In this way, a system becomes possible in which the mobile stations 2, 3 are especially simple in design, since the ISI and MAI are taken into account solely in the base station 1. In a corresponding TDD system (time division duplex system), in which the downlink transmission and the uplink transmission takes place in adjacent slots in the same frequency band, it is also very easily possible to obtain the channel transmission properties by means of the first channel estimator 11 in the base station 1, because the properties of the applicable transmission channels can be ascertained by evaluation of the received uplink data in the base station 1. The corresponding channel impulse response or channel quality can also be transmitted from the applicable mobile station 2, 3 to the base station 1 by means of a data telegram.

If only a single radio channel is used for the transmission from the first radio station 1 to the second radio station 2, then despite the pre-equalization of the signal to be transmitted in the first radio station 1, amplitude incursions of the corresponding received signal can occur in the second radio station 2. The amplitude fluctuations, also known as fading, of the signal received in the second radio station 2 result from multi-path reception or radio obstruction when the second radio station 2 embodied as a mobile station is in motion, for instance in the vicinity of buildings. To prevent the amplitude fluctuations caused by multi-way reception, the transmission between the first radio station 1 and the second radio station 2 takes place via the two radio channels 20, 25. This will be described in further detail below in conjunction with FIG. 2. The first radio channel 20 forms a transmission path between the first antenna 50 and the third antenna 60, and the radio channel 25 forms a transmission path between the first antenna 50 and the fourth antenna 65. If on one of the two transmission paths an amplitude incursion of the signal transmitted over this transmission path occurs, then the signal can still be received with adequate amplitude in the second radio station 2 by way of the other one of the two transmission paths.

The first radio station 1 also includes a first transceiver 30, which includes an antenna switch and optionally a transmission/reception amplifier, and a second demodulator 75. The first antenna 50 is a transmitting/receiving antenna, so that the antenna switch in the first transceiver 30 serves to switch back and forth between the transmission and reception directions. In the transmission direction, the antenna switch of the first transceiver 30 connects the first modulator 4 to the first antenna 50. In the reception direction, the antenna switch of the first transceiver 30 connects the first antenna 50 to the second demodulator 75, which demodulates the received signals and sends them on to one or more data sinks. The received signals delivered to the second demodulator 75 are also delivered to the first channel estimator 11, which ascertains an estimate of a total impulse response of the two radio channels 20, 25 between the first radio station 1 and the second radio station 2 and sends this estimate on to the first modulator 4. The pre-equalization of the signal to be broadcast by the first antenna 50 of the first radio station 1 is then done in the first modulator 4 as a function of the estimate of the total impulse response. In the second radio station 2, the third antenna 60 is connected to a third transceiver 40, and the fourth antenna 65 is connected to a fourth transceiver 45. The third antenna 60 and the fourth antenna 65 are again each embodied as a transmitting/receiving antenna, so that in the third transceiver 40 and the fourth transceiver 45 there is each one antenna switch, to enable switching over between the two transmission directions. The second radio station 2 includes a second modulator 6, which in case of transmission is connected via the applicable antenna switch of the third transceiver 40 and the fourth transceiver 45 to both the third antenna 60 and the fourth antenna 65. In the case of reception, the applicable antenna switch of the third transceiver 40 and the fourth transceiver 45 connects the third antenna 60 and the fourth antenna 65 to the first demodulator 7, via an addition member 80. Before the addition of the two received signals by the addition member 80, the received signal furnished by the third transceiver 40 is multiplied by a first coefficient $c_1$, and the received signal furnished by the fourth transceiver 45 is multiplied by a second coefficient $c_2$. Conversely, in the case of transmission, transmitted data delivered to the second modulator 6 are multiplied, after their modulation in the second modulator 6, on the one hand by the first coefficient $c_1$ and delivered to the third antenna 60 via the third transceiver 40, and on the other are multiplied by the second coefficient $c_2$ and delivered to the fourth antenna 65, via the fourth transceiver 45.

By a suitable choice of the coefficients $c_1$, $c_2$, a directional effect or directional characteristic of the signals to be broadcast or received by the third antenna 60 and the fourth antenna 65 can be achieved, which is advantageously aimed at the first radio station 1. In this way, signal incursions from fading can also be counteracted. Via the addition member 80, the received signals furnished by the third antenna 60 and the fourth antenna 65 are combined linearly and then delivered for demodulation in the first demodulator 7. The first coefficient $c_1$ is associated with the first radio channel 20, and the second coefficient $c_2$ is associated with the second radio channel 25. In the second modulator 6, reference signals can be formed, which after multiplication by the first coefficient $c_1$ or the second coefficient $c_2$ are transmitted to the first radio station 1 via the associated radio channel 20, 25. The estimate of the total impulse response in the first channel estimator 11 is derived from the superimposed reception of the reference signals in the base station 1.

Figure 3:
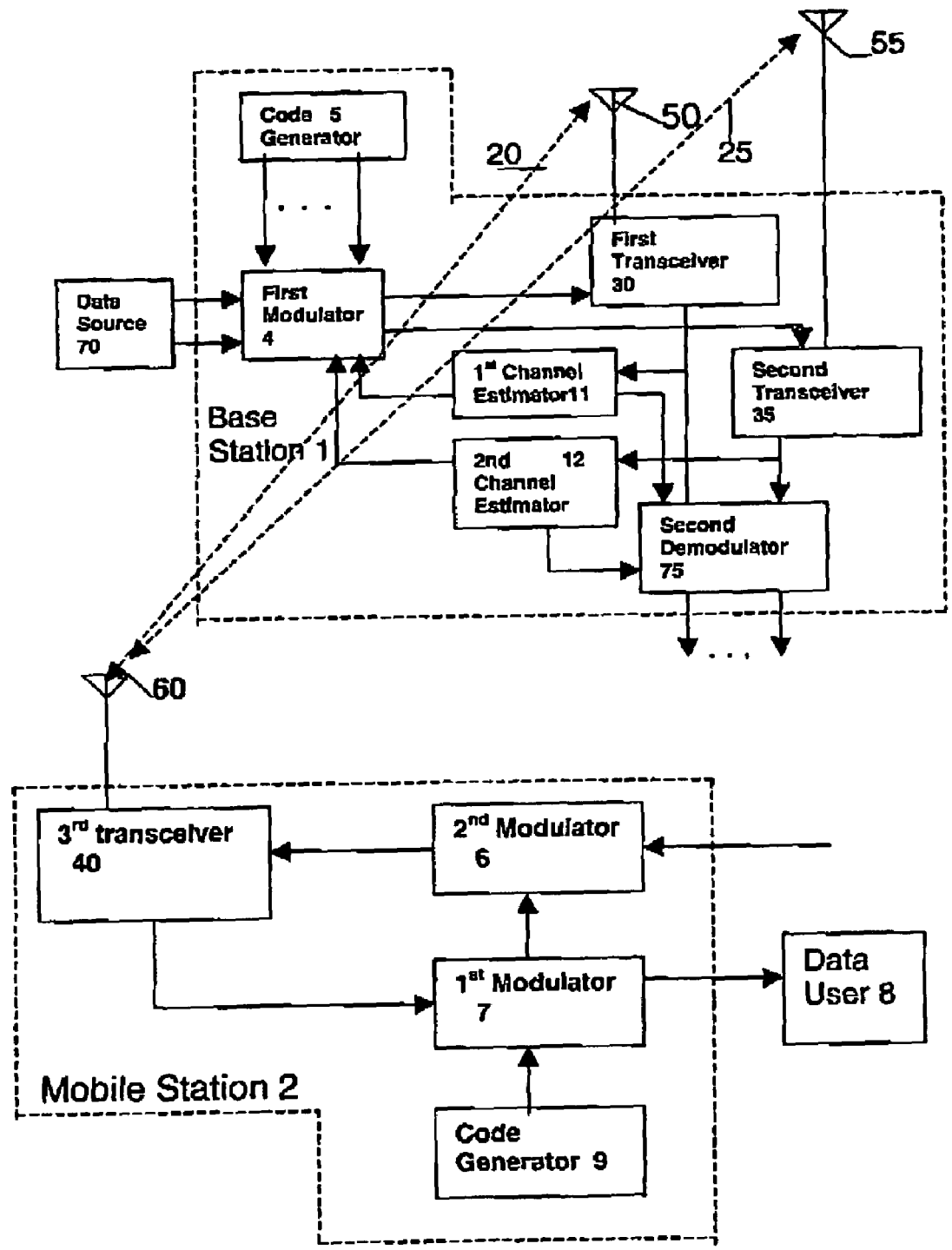
FIG. 3 shows a second embodiment for the first and second radio stations.

In FIG. 3, the same reference numerals identify elements that are the same as in FIG. 2. Unlike FIG. 2, the first radio station 1 now has not only the first antenna 50 but also a second antenna 55 while conversely the second radio station 2 includes only the third antenna 60. The first radio channel 20 in FIG. 3 now defines the transmission path between the first antenna 50 and the third antenna 60, and the second radio channel 25 defines the transmission path between the second antenna 55 and the third antenna 60. Thus in FIG. 3, in the second radio station 2 only the third transceiver 40 is necessary, which in turn includes one antenna switch for both of the possible transmission directions; this antenna switch on the one hand connects the second modulator 6 to the third antenna 60 and on the other connects the first demodulator 7 to the third antenna 60, as a function of the transmission direction. The first radio station 1, conversely, now includes in addition to the first transceiver 30 a second transceiver 35, which likewise includes an antenna switch that connects the second antenna 55 to the first modulator 4 for transmission, and for reception connects it to the second demodulator 75 and also, via a second channel estimator 12, to the first modulator 4. The second channel estimator 12 can additionally, as shown in FIG. 3, be connected to the second demodulator 75 as well, in order to eliminate ISI and MAI from the received signals.

In this way, one pre-equalized signal each is broadcast by the first antenna 50 and the second antenna 55 and transmitted via the first radio channel 20 and the second radio channel 25, respectively, to the third transceiver 40; for the first radio channel 20, an estimate of its impulse response is ascertained in the first channel estimator 11, and for the second radio channel 25, an estimate of its impulse response is ascertained in the second channel estimator 12. The pre-equalization of the signal to be broadcast by the first antenna 50 is then performed in the first modulator 4 as a function of the estimate of the impulse response of the first radio channel 20 and the estimate of the impulse response of the second radio channel 25, and the pre-equalization of the signal to be broadcast by the second antenna 55 is performed in the first modulator 4 as a function of the estimate of the impulse response of the first radio channel 20 and the estimate of the impulse response of the second radio channel 25. By the third antenna 60 of the second radio station 2, a reference signal is transmitted to the first radio station 1, via the two radio channels 20, 25 and the first antenna 50 and the second antenna 55. The estimate of the impulse response of the first radio channel 20 is then derived in the first channel estimator 11 from the reception of the reference signal via the first radio channel 20, and the estimate of the impulse response of the second radio channel 25 is derived in the second channel estimator 12 from the reception of the reference signal via the second radio channel 25.

The pre-equalization of the signal to be broadcast by the first antenna 50 and by the second antenna 55 is done as a function of all the codes currently used in the radio cell of the first radio station 1 and as a function of the transmission properties of all the radio channels currently used there, which are ascertained in the two channel estimators 11, 12. This is also true for the exemplary embodiment of FIG. 2, using only the first antenna 50 to broadcast signals from the first radio station 1, and using only the first channel estimator 11.

It can also be provided that both the first radio station 1 and the radio station 2 are each equipped with two antennas, resulting in four radio channels that make even better protection against fading possible. In the first radio station 1 and the second radio station 2, it is also possible arbitrarily to use more antennas, so that an arbitrary number of radio channels can be set up between the first radio station 1 and the second radio station 2; as the number of radio channels between the first radio station 1 and the second radio station 2 increases, the influence of fading on the signal transmission decreases.

It can also be provided that the pre-equalization be done not in the base station 1 but in the mobile stations 2, 3 in a corresponding way. The multi-channel transmission method between the base station 1 and the mobile stations 2, 3, which will hereinafter be called users, and in which the transmission properties of all the radio channels (ISI) and the codes of all the radio channels (MAI) are taken into account, will be described below by mathematical formulas. These formulas can be realized either by means of a suitable program or suitable hardware modules that implement these formulas.

Figure 4:
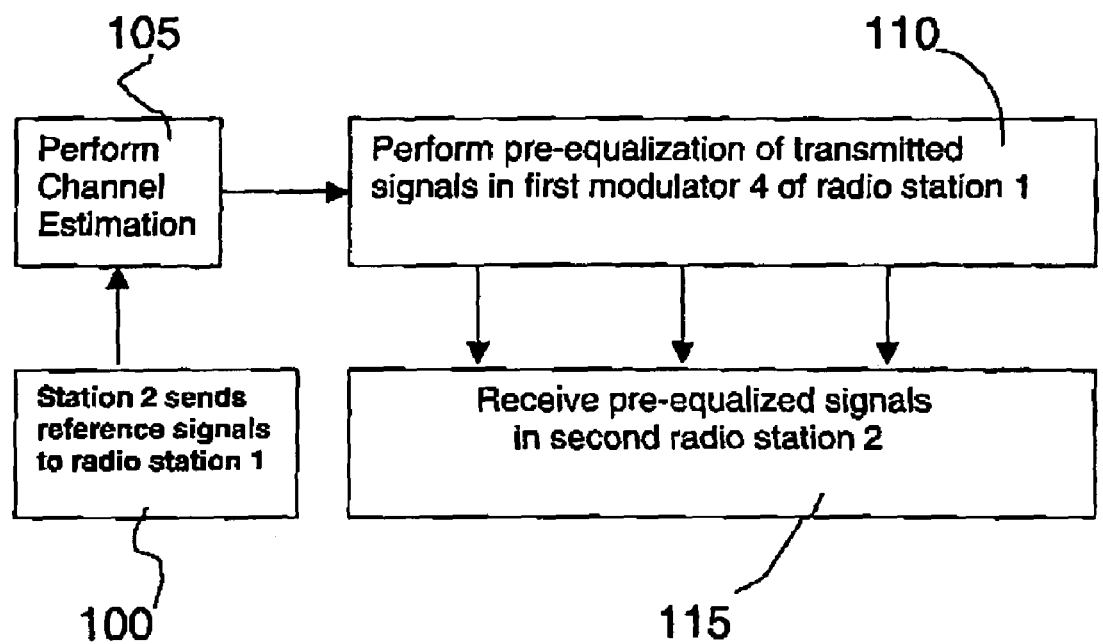
FIG. 4 shows a chronological flow chart of the method of the invention.

FIG. 4 shows a chronological flow chart in TDD operation with pre-equalization. In a first step 100, the second radio station 2 sends reference signals for estimating the transmission properties of the two radio channels 20, 25 to the first radio station 1. This channel estimation is performed in a second step 105 in the first radio station 1 after the reference signals have been received. Next, in the first modulator 4 of the first radio station 1, a pre-equalization of the signals to be transmitted to the radio station 2 takes place in a third step 110. The pre-equalized signals are then received by the second radio station 2 in a fourth step 115 and require no further equalization there.

As a first example, two-channel transmission between the first antenna 50 and the third antenna 60, or the fourth antenna 65, will be described in accordance with FIG. 2. The second radio station 2 is meant to represent one of a plurality of users.

A discrete-time multiple transmission system with block-wise transmission is assumed. Let $d^{(k)}=(d^{(k)}_1, \ldots, d^{(k)}_M)$, where $k=1, \ldots, K$, be the vector of the M data symbols, to be transmitted, of a data block of the $k^{th}$ user.

$d=(d^{(1)}, \ldots, d^{(K)})$ designates the summarization of all the data symbols to be transmitted. Let each of the K users be assigned a CDMA code $c^{(k)}=(c^{(k)}_1, \ldots, c^{(k)}_Q)$, where $k=1, \ldots, K$, of length Q. By expanding the data bits, which are to be transmitted, with the CDMA codes, each bit is distributed to Q so-called chips. A chip clock period amounts to precisely 1/Q of the bit clock period. With the code matrix $$C^{(k)} = \underbrace{\begin{pmatrix} \underline{c}^{(k)T} & 0 & 0 \\ 0 & \ddots & 0 \\ 0 & 0 & \underline{c}^{(k)T} \end{pmatrix}}_{M} \bigg\} M \cdot Q, k=1, \ldots, K$$

$\underline{c}^{(k)T}$ = transposed vector $\underline{c}^{(k)}$ of the $k^{th}$ user, the expansion of a data block of the $k^{th}$ user can be written as:

$c^{(k)} \cdot d^{(k)T}$.

The entire block of M data bits is distributed among M·Q chips. Combining the chip clock signals of all the users yields $C \cdot d^T$ and the matrix $$C = \begin{pmatrix} C^{(1)} & 0 & 0 \\ 0 & \ddots & 0 \\ 0 & 0 & C^{(K)} \end{pmatrix}$$

summarizes the code matrixes of all the users.

After the modulation, the signals are linearly pre-equalized according to the invention. In FIGS. 2 and 3, the steps of modulation and pre-equalization, which are handled mathematically separately here, are performed by the first modulator 4. Let the pre-equalization be written by means of the matrix P. The result is the transmission signal s:

$$s^T = P \cdot C \cdot d^T.$$

s reaches the $k^{th}$ user via the two radio channels 20, 25 in the exemplary embodiment of FIG. 2. Let $h^{(k,l)} = (h_1^{(k,l)}, \ldots, h_w^{(k,l)})$, where $k=1, \ldots, K$, and $l=1, 2$, represent the impulse responses of the two radio channels 20, 25 for the $k^{th}$ user with respect to the chip clock frequency. W is the number of chip clock periods over which a multi-way reception is taken into account. By means of the multi-way channel, the data blocks of the chip clock length M·Q are stretched out to M·Q+W−1 chip pulses. The last W−1 chip card are superimposed on the first W−1 chip card of the next data block. The demodulator of the $k^{th}$ user receives not only the multi-way signal per radio channel 20, 25 but generally also additive noise $$n^{(k,l)} = (n_1^{(k,l)}, \ldots, n_{M \cdot Q+W-1}^{(k,l)}),$$

where $k=1, \ldots, K$, and $l=1, 2$, of length M·Q+W−1.

With the matrixes $$H^{(k,l)} = \begin{pmatrix} h_1^{(k,l)} & 0 & 0 \\ \vdots & \ddots & 0 \\ h_W^{(k,l)} & \vdots & h_1^{(k,l)} \\ 0 & \ddots & \vdots \\ 0 & 0 & h_W^{(k,l)} \end{pmatrix} \underbrace{\phantom{xxxxx}}_{M \cdot Q} \Bigg\} M \cdot Q +$$

$$D = \begin{pmatrix} 1 & 0 & 0 & 1 & 0 & 0 & \cdots \\ 0 & \ddots & 0 & 0 & \ddots & 0 & \cdots \\ 0 & 0 & 1 & 0 & 0 & 1 & \cdots \end{pmatrix} \Bigg\} M \cdot$$

the demodulator of the $k^{th}$ user of the system accordingly receives the two reception signals $$r^{(k,l)T} = H^{(k,l)} \cdot D \cdot P \cdot C \cdot d^T + n^{(k,l)T},$$

where $l=1, 2$ and $k=1, \ldots, K$.

The matrix D adds up the pre-equalized chip clock signals of all the users, so that they can be broadcast via an antenna.

The two received signals $r^{(k,l)}$, where $l=1, 2$ and $k=1, \ldots, K$, are first linearly combined by the addition member 80 to form $$r^{(k)} = c_1 r^{(k,1)} + c_2 r^{(k,2)}.$$

A suitable demodulator of the $k^{th}$ user in accordance with FIG. 2 can be embodied as a simple "matched filter", which compresses the received chip clock signal with the CDMA code of the desired data signal. This "matched filter" receiver (l-finger rake receiver) for the $k^{th}$ user code $c^{(k)}$:

$$R^{(k)} = \begin{pmatrix} 0 & 0 & 0 \\ \vdots & \vdots & \vdots \\ 0 & & \\ c^{(k)T} & 0 & \\ 0 & \ddots & 0 \\ 0 & 0 & c^{(k)T} \end{pmatrix} \Bigg\} M \cdot Q + W - 1$$

demodulates the linearly combined received signals into [paste in German page 20, the line between lines 5 and 10] where $R^{(k)H}$=conjugated complex transposed matrix $R(k)$.

With the summarizations [paste in German page 20, bottom three equations]

$$R = \begin{pmatrix} R^{(1)} & 0 & 0 \\ 0 & \ddots & 0 \\ 0 & 0 & R^{(K)} \end{pmatrix}$$

$$H = \begin{pmatrix} c_1 H^{(1,1)} + c_2 H^{(1,2)} & 0 & 0 \\ 0 & \ddots & 0 \\ 0 & 0 & c_1 H^{(K,1)} + c_2 H^{(K,2)} \end{pmatrix}$$

$$\underline{n} = (c_1 \cdot \underline{n}^{(1,1)} + c_2 \cdot \underline{n}^{(1,2)}, \ldots, c_1 \cdot \underline{n}^{(K,1)} + c_2 \cdot \underline{n}^{(K,2)})$$

all the demodulated signals are received as a total vector:

$$\hat{d} = R^H \cdot H \cdot D^T D \cdot P \cdot C \cdot d^T + R^H \cdot n^T$$

The M·K×M·Q·K matrix $R^H \cdot H \cdot D^T \cdot D$ in general has the rank of M·K. Therefore $(R^H \cdot H \cdot D^T \cdot D) \cdot (R^H \cdot H \cdot D^T \cdot D)$ is invertable, and the following is true:

$$P = (R^H \cdot H \cdot D^T \cdot D)^H \cdot$$

$$\left[ (R^H \cdot H \cdot D^T \cdot D) \cdot (R^H \cdot H \cdot D^T \cdot D)^H \right]^{-1} \cdot \underline{d}^T \cdot \frac{1}{\|C \cdot \underline{d}^T\|^2} \cdot (C \cdot \underline{d}^T)^H$$

With this choice, the following becomes true $$\hat{d}^T = d^T + R^H \cdot n^T$$

$R^H$ thus furnishes the transmitted data symbols $d^T$ and additive noise. Despite the use of a very simple receiver, the detected signal contains neither ISI nor MAI. These kinds of interference are eliminated on the transmitter side by means of pre-equalization.

H can simply be estimated by the first channel estimator 11 of the first radio station 1.

A reference signal $p^{(k)}$ of the $k^{th}$ user, transmitted in the uplink transmission for channel estimation, is sent via the third antenna 60 in the form $c_1 \cdot p^{(k)}$ and via the fourth antenna 65 in the form $c_2 \cdot p^{(k)}$. The base station 1 therefore receives the corresponding signal $$H^{(k,1)} \cdot c_1 \cdot p^{(k)} + H^{(k,2)} \cdot c_2 \cdot p^{(k)} = c_1 \cdot H^{(k,1)} \cdot p^{(k)} + c_2 \cdot H^{(k,2)} \cdot p^{(k)},$$

and estimates the total impulse response of the two radio channels 20, 25 of the $k^{th}$ user as $h^{(k)}=c_1 \cdot h^{(k,1)}+c_2 \cdot h^{(k,2)}$.

Second, the method for signal transmission between the base station 1 and the mobile stations 2, 3 will be described in accordance with FIG. 3, in which the multi-channel transmission takes place between the base station 1 and each of the mobile stations 2, 3 via two radio channels 20, 25 each; transmission is done both between the first antenna 50 and the third antenna 60 and between the second antenna 55 and the third antenna 60 in FIG. 3.

Once again a discrete-time multiple transmission system with blockwise transmission is assumed. Let $d^{(k)}=(d^{(k)}_1, \ldots, d^{(k)}_M)$, where $k=1, \ldots, K$, be the vector of the M data symbols, to be transmitted, of a data block of the $k^{th}$ user. $d=(d^{(1)}, \ldots, d^{(K)})$ designates the summarization of all the data symbols to be transmitted. Let each of the K users be assigned a CDMA code $c^{(k)}=(c^{(k)}_1, \ldots, c^{(k)}_Q)$, where $k=1, \ldots K$, of length Q. By expanding the data bits, which are to be transmitted, with the CDMA codes, each bit is distributed to Q so-called chips. A chip clock period amounts to precisely 1/Q of the bit clock period. With the code matrix $$C^{(k)} = \underbrace{\begin{pmatrix} \underline{c}^{(k)T} & 0 & 0 \\ 0 & \ddots & 0 \\ 0 & 0 & \underline{c}^{(k)T} \end{pmatrix}}_{M} \Big\} M \cdot Q, k=1, \ldots, K$$

$\underline{c}^{(k)T}$ = transposed vector $\underline{c}^{(k)}$ of the $k^{th}$ user, the expansion of a data block of the $k^{th}$ user can be written as:

$$c^{(k)} \cdot d^{(k)T}.$$

The entire block of M data bits is distributed among M·Q chips. Combining the chip clock signals of all the users yields $$C \cdot d^T$$

and the matrix $$C = \begin{pmatrix} C^{(1)} & 0 & 0 \\ 0 & \ddots & 0 \\ 0 & 0 & C^{(K)} \end{pmatrix}$$

summarizes the code matrixes of all the users.

After the modulation, the signals are linearly pre-equalized according to the invention. In FIGS. 2 and 3, the steps of modulation and pre-equalization, which are handled mathematically separately here, are performed by the first modulator 4. Let the pre-equalization be written by means of the matrix P.

The resultant transmission signals $s^{(l)}$, where $l=1, 2$, of the first antenna 50 and the second antenna 55 are assumed to be summarized in a total signal vector $s=(s^{(1)}, s^{(2)})$, where:

$$s^T = P \cdot C \cdot d^T.$$

The total signal vector s reaches the $k^{th}$ user via the two radio channels 20, 25 in the exemplary embodiment of FIG. 3. Let $h^{(k,l)}=(h^{(k,l)}_1, \ldots, h^{(k,l)}_W)$, where $k=1, \ldots, K$, and $l=1, 2$, represent the impulse responses of the two radio channels 20, 25 for the $k^{th}$ user with respect to the chip clock frequency. W is the number of chip clock periods over which a multi-way reception is taken into account. By means of the multi-way channel, the data blocks of the chip clock length M·Q are stretched out to M·Q+W−1 chip pulses. The last W−1 chip card are superimposed on the first W−1 chip card of the next data block. The demodulator of the $k^{th}$ user receives not only the multi-way signal per radio channel 20, 25 but generally also the additive noise $n^{(k,l)}=(n^{(k,l)}_1, \ldots, n^{(k,l)}_{M \cdot Q+W-1})$, where $k=1, \ldots K$, and $l=1, 2$, of length M·Q+W−1.

With the matrixes $$H^{(k,l)} = \underbrace{\begin{pmatrix} h^{(k,l)}_1 & 0 & 0 \\ \vdots & \ddots & 0 \\ h^{(k,l)}_W & \vdots & h^{(k,l)}_1 \\ 0 & \ddots & \vdots \\ 0 & 0 & h^{(k,l)}_W \end{pmatrix}}_{M \cdot Q} \Big\} M \cdot Q + W - 1$$

$$D = \underbrace{\begin{pmatrix} D_0 & 0 \\ 0 & D_0 \end{pmatrix}}_{2 \cdot M \cdot Q \cdot K} \Big\} 2 \cdot M \cdot Q$$

$$D_0 = \underbrace{\begin{pmatrix} 1 & 0 & 0 & 1 & 0 & 0 & \cdots \\ 0 & \ddots & 0 & 0 & \ddots & 0 & \cdots \\ 0 & 0 & 1 & 0 & 0 & 1 & \cdots \end{pmatrix}}_{M \cdot Q \cdot K} \Big\} M \cdot Q$$

the demodulator of the $k^{th}$ user of the system receives the signal $$r^{(k)T} = H^{(k,1)}, H^{(k,2)} \cdot D \cdot P \cdot C \cdot d^T + n^{(k,1)T} n^{(k,2)T}.$$

A suitable demodulator of the $k^{th}$ user in accordance with FIG. 3 can be embodied as a simple "matched filter", which compresses the receive chip clock signal with the CDMA code of the desired data signal. This "matched filter" receiver (l-finger rake receiver) for the $k^{th}$ user code $c^{(k)}$:

$$R^{(k)} = \underbrace{\begin{pmatrix} 0 & 0 & 0 \\ \vdots & \vdots & \vdots \\ 0 & & \\ \underline{c}^{(k)T} & 0 & \\ 0 & \ddots & 0 \\ 0 & 0 & \underline{c}^{(k)T} \end{pmatrix}}_{M} \Big\} M \cdot Q + W - 1$$

demodulates the received signal into $$\hat{d}^{(k)T} = R^{(k)H} \cdot r^{(k)T}$$

where $R^{(k)H}$ = conjugated complex transposed matrix $R^{(k)}$.

With the summarizations $$R = \begin{pmatrix} R^{(1)} & 0 & 0 \\ 0 & \ddots & 0 \\ 0 & 0 & R^{(K)} \end{pmatrix}$$

$$H = \begin{pmatrix} H^{(1,1)} & 0 & 0 & H^{(1,2)} & 0 & 0 \\ 0 & \ddots & 0 & 0 & \ddots & 0 \\ 0 & 0 & H^{(K,1)} & 0 & 0 & H^{(K,2)} \end{pmatrix}$$

$$\underline{n} = (\underline{n}^{(1,1)} + \underline{n}^{(1,2)}, \ldots, \underline{n}^{(K,1)} + \underline{n}^{(K,2)})$$

all the demodulated signals are received as a total vector:

$$\tilde{d} = R^H \cdot H \cdot D^T \cdot D \cdot P \cdot C \cdot d^T + R^H \cdot n^T$$

The K·K×M·Q·K matrix $R^H \cdot H \cdot D^T \cdot D$ in general has the rank of M·K. Therefore $(R^H \cdot H \cdot D^T \cdot D) \cdot (R^H \cdot H \cdot D^T \cdot D)$ is invertable, and the following is true:

$$P = (R^H \cdot H \cdot D^T \cdot D)^H \cdot$$
$$\left[ (R^H \cdot H \cdot D^T \cdot D) \cdot (R^H \cdot H \cdot D^T \cdot D)^H \right]^{-1} \cdot \underline{d}^T \cdot \frac{1}{\|C \cdot \underline{d}^T\|^2} \cdot (C \cdot \underline{d}^T)^H$$

With this choice, the following becomes true $$\tilde{d}^T = d^T + R^H \cdot n^T$$

$R^H$ thus furnishes the transmitted data symbols $d^T$ and additive noise. Despite the use of a very simple receiver, the detected signal contains neither ISI nor MAI. These kinds of interferences are eliminated on the transmitter side by means of pre-equalization.

H can simply be estimated by the two channel estimators 11, 12 of the first radio station 1.

The invention claimed is:

1. A radio station (1) comprising
   at least two antennas (50,55) from which pre-equalized signals are propagated over respective radio channels (20,25) to be an additional radio station (2);
   a code generator (5) for widening data transmitted with the pre-equalized signals with a respective code, said code generator ascertaining said respective code according to a selected radio link; at least one channel estimator comprising means for determining an estimate of an impulse response of each of said radio channels (20, 25); and
   a modulator (4) including means for pre-equalization of radio signals to be transmitted to form the pre-equalized signals according to said estimate of said impulse response for each of said radio channels;
   wherein said means for pre-equalization of said radio signals to be transmitted from said at least two antennas (50, 55) performs said pre-equalization according to all actually used codes and transmission properties of all actually used ones of said radio channels (20,25).

2. A method for transmitting signals between a first radio station (1) and a second radio station (2), said second radio station having a plurality of antennas (60,65) and said first radio station (1) including a modulator (4) with pre-equalization means, said method comprising the steps of:
   a) performing a pre-equalization of radio signals to be transmitted in said modulator (4) of said first radio station in order to form pre-equalized signals;
   b) transmitting said pre-equalized signals from the first radio station (1) over each of a plurality of radio channels (20,25) to the second radio station (2);
   c) receiving said pre-equalized signals transmitted over each of said radio channels (20,25) in the second radio station, said pre-equalized signals transmitted over respective channels being received in said second radio station (2) by corresponding antennas of the second radio station; and
   d) determining an estimate of a total impulse response of all of said radio channels (20,25) in said first radio station (1);
   wherein said pre-equalization of said radio signals is performed by said modulator (4) according to said estimate of said total impulse response determined in step d).

3. The method as defined in claim 2, wherein received signals received by said antennas (60,65) of said second radio station (2) are combined linearly and subsequently input to a demodulator for demodulation.

4. The method as defined in claim 3, further comprising transmitting respective reference signals from said antennas (60,65) of said second radio station (2) over said radio channels (20,25) to said first radio station (1) and wherein said estimate of said total impulse response is derived from superimposed reference signals received in said first radio station (1).

5. The method as defined in claim 4, wherein said respective reference signals are multiplied with corresponding coefficients depending on which of said radio channels (20,25) is employed in transmitting said reference signals and said superimposed reference signals received in said first radio station are multiplied with said corresponding coefficients of said radio channels employed for transmitting said reference signals.

6. The method as defined in claim 2, further comprising transmitting additional radio signals to said first radio station (1) from additional radio stations (3), and wherein data transmitted with said additional radio signals from said additional radio stations are widened with different codes and said pre-equalization is performed in said modulator (4) of said first radio station (1) according to all of said different codes and transmission properties of all of said radio channels.

7. The method as defined in claim 6, wherein said transmission properties of said radio channels are determined from said data transmitted to the first radio station (1) from said additional radio stations (3) and from additional data transmitted to the first radio station (1) from the second radio station (2).

8. A radio station (2) comprising
   at least two antennas (60,65) for transmitting and receiving radio signals to and from another radio station (1) over corresponding radio channels (20, 25);
   means for transmitting respective weighted reference signals to said another radio station (1) from said at least two antennas (60,65) over said corresponding radio channels (20,25), so that estimates of the impulse responses of said corresponding radio channels are derived from said respective weighted reference signals in said another radio station (1), wherein said respective weighted reference signals are formed by multiplying respective reference signals by corresponding coefficients assigned to said at least two antennas, and so that said respective weighted reference signals are transmitted from corresponding antennas associated with said respective coefficients;

means for multiplying corresponding received signals from said at least two antennas with said respective coefficients ($c_1$, $c_2$) to form weighted received signals, said corresponding received signals comprising pre-equalized signals obtained by a pre-equalization performed according to said estimates of said impulse responses and transmitted from said another radio station (1);

means for adding said weighted received signals to form a resulting linear combination; and means for inputting said resulting linear combination to a demodulator.

9. A radio station (1) comprising a modulator (4) comprising means for pre-equalization of radio signals to be transmitted to a second radio station (2) so as to form pre-equalized signals;

means for transmitting said pre-equalized signals over each of a plurality of radio channels (20,25) to said second radio station (2), said second radio station having a plurality of antennas (60,65) corresponding to said plurality of said radio channels; and means for performing an estimate of a total impulse response of said plurality of said radio channels (20,25) from respective reference signals received over said radio channels from said second radio station;

wherein said means for pre-equalization performs said pre-equalization according to said estimate of said total impulse response of said plurality of said radio channels.

10. A method for transmitting signals between a first radio station (1) and a second radio station (2), said first radio station comprising a modulator (4) with means for pre-equalization, said method comprising the steps of:

a) performing a pre-equalization of radio signals to be transmitted in said modulator (4) of said first radio station in order to form pre-equalized signals;

b) transmitting said pre-equalized signals from the first radio station (1) over each of a plurality of radio channels (20,25) to the second radio station (2);

c) receiving said pre-equalized signals transmitted over each of said radio channels (20,25) in the second radio station;

d) transmitting other signals over additional channels from other radio stations (3) to the first radio station (1); and e) widening data transmitted from different radio stations including the other radio stations with different codes;

wherein said pre-equalization in said modulator (4) of said first radio station is performed according to all of said different codes and according to transmission properties of all of said radio channels and said additional channels.

11. The method as defined in claim 10, further comprising performing an estimate of an impulse response of said radio channels (20, 25) in said first radio station (1), and wherein said pre-equalized signals are propagated from plural antennas (50,55) of the first radio station (1) and transmitted over said plurality of said radio channels (20,25) to the second radio station (2), and said pre-equalization of said signals propagated from said plural antennas (50,55) is performed according to said estimate of said impulse response.

12. The method as defined in claim 11, wherein a respective reference signal is transmitted to said first radio station (1) from a corresponding antenna (60) of said second radio station (2) over said plurality of said radio channels (20,25) and said estimate of said impulse response of said plurality of said radio channels (20,25) is derived from said respective reference signal transmitted over said radio channels (20,25) to said first radio station.

13. The method as defined in claim 10, further comprising performing an estimate of an impulse response of each of said radio channels (20,25) in said first radio station (1), and wherein said pre-equalized signals propagated by the first radio station (1) are transmitted over said plurality of said radio channels (20,25) and received by corresponding antennas (60,65) of said second radio station (2), said pre-equalization of said signals propagated by said first radio station (1) is performed according to said estimate of said total impulse response, and received signals received by said corresponding antennas (60,65) of said second radio station (2) are combined linearly and subsequently input to a demodulator.

14. The method as defined in claim 13, wherein respective reference signals are transmitted to the first radio station (1) over said plurality of said radio channels (20,25) and said estimate of said total impulse response is derived from said respective reference signals in said first radio station (1).

15. The method as defined in claim 14, wherein said respective reference signals are multiplied by corresponding coefficients according to which of said radio channels is used for transmission of said respective reference signals and wherein said received signals received by said corresponding antennas (60, 65) of said second radio station (2) are multiplied by said corresponding coefficients and then linearly combined with each other.

16. The method as defined in claim 10, wherein said transmission properties of said radio channels and said additional channels are ascertained from data transmissions of the second radio station (2) and the additional radio stations (2) to the first radio station.

* * * * *